United States Patent
Kuroki et al.

(10) Patent No.: US 9,159,169 B2
(45) Date of Patent: Oct. 13, 2015

(54) IMAGE DISPLAY APPARATUS, IMAGING APPARATUS, IMAGE DISPLAY METHOD, CONTROL METHOD FOR IMAGING APPARATUS, AND PROGRAM

(71) Applicant: CANON KABUSHIKI KAISHA, Tokyo (JP)

(72) Inventors: Tsuyoshi Kuroki, Yokohama (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 13/758,891

(22) Filed: Feb. 4, 2013

(65) Prior Publication Data
US 2013/0201182 A1 Aug. 8, 2013

(30) Foreign Application Priority Data
Feb. 8, 2012 (JP) .................... 2012-025412

(51) Int. Cl.
G06T 15/00 (2011.01)
G06T 19/20 (2011.01)
G06T 19/00 (2011.01)
G06T 7/00 (2006.01)

(52) U.S. Cl.
CPC ............. *G06T 19/20* (2013.01); *G06T 7/0042* (2013.01); *G06T 19/006* (2013.01)

(58) Field of Classification Search
None
See application file for complete search history.

(56) References Cited

U.S. PATENT DOCUMENTS

2009/0109241 A1* 4/2009 Tsujimoto ................. 345/633
2010/0287485 A1* 11/2010 Bertolami et al. .......... 715/764
2013/0016102 A1* 1/2013 Look et al. ................. 345/426

OTHER PUBLICATIONS

Yoshida, Yuichi, and Mitsuru Ambai. "Realtime Mobile AR with Fast Object Recognition Framework." (2011).
Klein, Georg, and David Murray. "Parallel Tracking and Mapping on a Camera Phone." Active Vision Laboratory. Department of Engineering Science, University of Oxford, ISMAR 2009, 8th IEEE International Symposium on Mixed and Augmented Reality.
Bastian, John, Ben Ward, Rhys Hill, Anton Hengel, and Anthony Dick. "Interactive Modelling for AR Applications." School of Computer Science. University of Adelaide, Australia, ISMAR 2010, 9th IEEE International Symposium on Mixed and Augmented Reality.

* cited by examiner

Primary Examiner — Yingchun He
(74) Attorney, Agent, or Firm — Canon U.S.A., Inc., IP Division

(57) ABSTRACT

In a message exchange system, when an imaging apparatus transmits a photograph-attached message, the imaging apparatus transmits a captured image, position and orientation information of the imaging apparatus, feature point information of an object included in the captured image, and three-dimensional structure information of the object to a server. When an image display apparatus receives the message from the server, the image display apparatus corrects the captured image in a direction corresponding to a position and orientation of the image display apparatus based on the position and orientation information of the imaging apparatus, the feature point information of the object, and the three-dimensional structure information of the object.

4 Claims, 16 Drawing Sheets

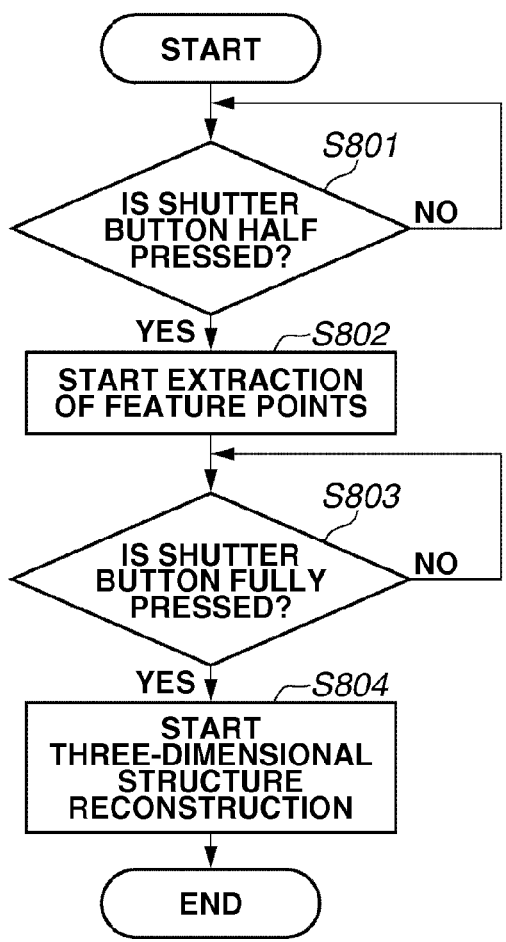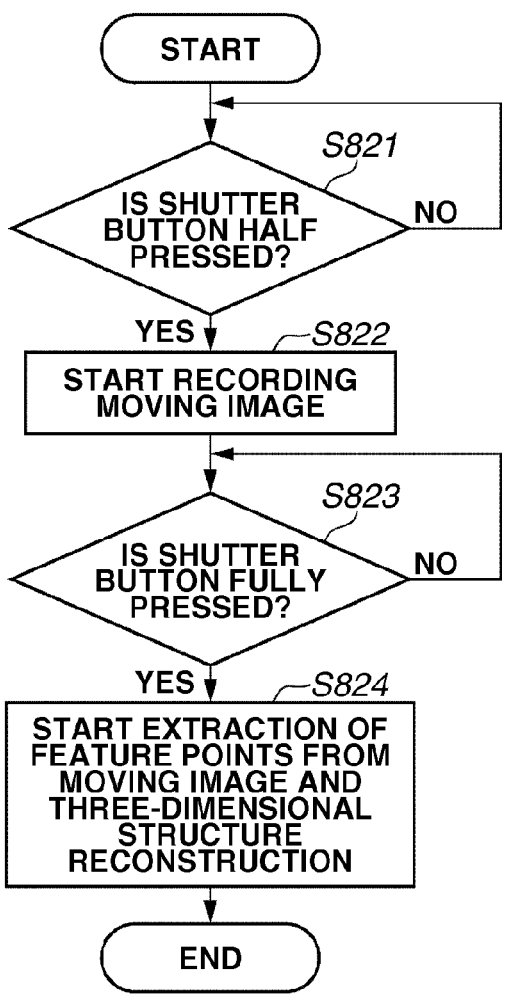

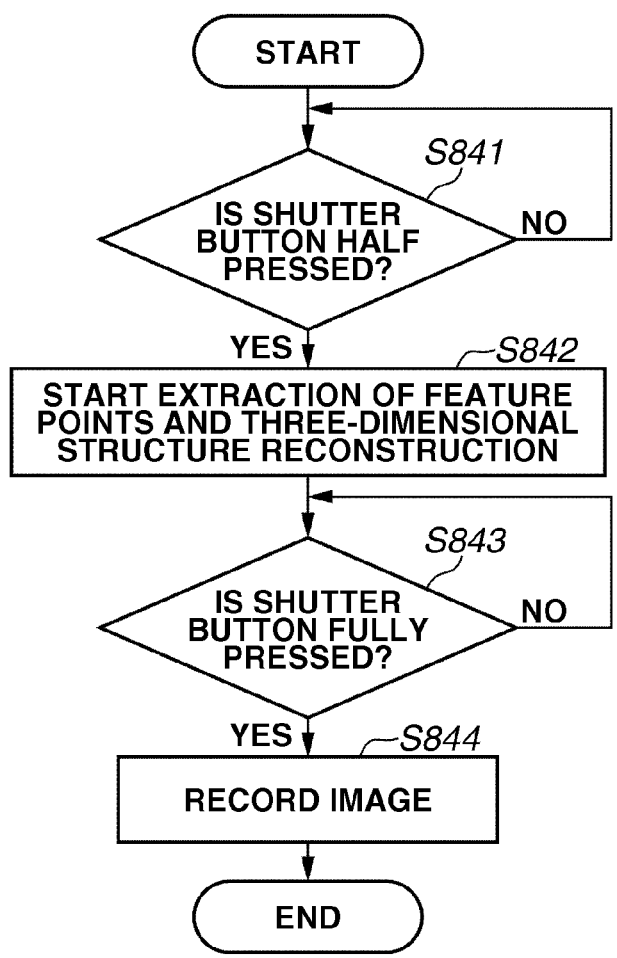

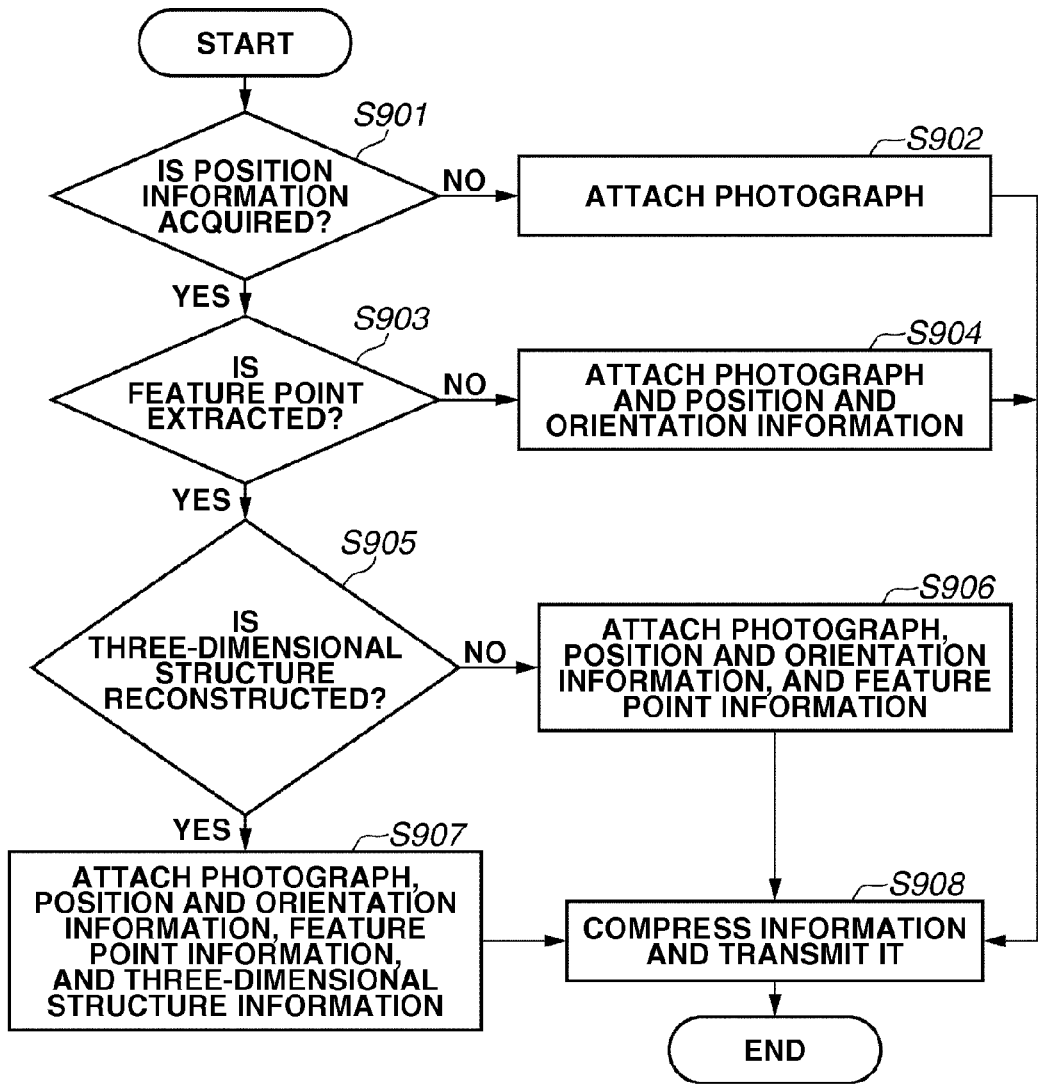

IMAGE DISPLAY APPARATUS, IMAGING APPARATUS, IMAGE DISPLAY METHOD, CONTROL METHOD FOR IMAGING APPARATUS, AND PROGRAM

BACKGROUND OF THE INVENTION

1. Field of the Invention

The present invention relates to an image display apparatus, an imaging apparatus, an image display method, a control method for the imaging apparatus, and a program.

2. Description of the Related Art

Nowadays, cellular phones having a wireless communication function are generally used in sharing or exchanging images and messages between users. Such a message exchange system is useful in attaching a text to a captured image and transmitting the text-attached image.

On the other hand, a technique called augmented reality technique has become popular these days. The augmented reality technique superimposes computer graphics (CG) on an image captured by a camera when it is displayed. By using this technique, the provider of the augmented reality system can provide the user with a feeling that the CG-superimposed image is the real image.

In recent years, a message exchange system using augmented reality technique which combines the above-described two systems is also used. According to this message exchange system, if a user of an information terminal sees one's surroundings using a camera which is integrated in the terminal, the user can see messages posted by other users or himself via the display screen. According to such a message exchange system using the augmented reality technique, the posted messages are displayed at the positions corresponding to the position information acquired from a position information acquisition unit in the information terminal. The position information acquisition unit is, for example, based on the global positioning system (GPS). If the user in the vicinity of the arranged message looks around while holding the information terminal, the user can see a message-added CG on the display screen of the information terminal in the direction where the message was posted.

With respect to such a conventional message exchange system, the message is displayed by the processes described below. First, if a poster desires to post a message, the poster starts a message exchange application and touches a posting button. Then, the poster inputs a text message to be posted. At this time, if the user desires to attach a photograph to the text, the poster presses the shooting button and performs imaging. Then, when the poster touches the send button, the input text and the photograph which was taken are transmitted to a message exchange server by wireless communication. When the text and the photograph are transmitted, position information of the information terminal of the poster is also transmitted in association with the text and the photograph. The position information is acquired by a position information acquisition unit of the information terminal.

If another user desires to view the posted message, the following processing is performed. First, the user starts the message exchange application by operating the information terminal. When the application is started, the position information of the information terminal of the user is transmitted to the message exchange server by the information terminal. Further, the information terminal downloads a list of messages associated with the position of the user, for example, within 500 meters from the position of the user, by wireless communication.

Some of the messages of the downloaded group may be associated with the position information of where the messages were posted. If the user holds the information terminal in the direction the user desires to see, an image captured in that direction is displayed on the display screen of the information terminal. Further, if a posted message exists in that direction, the posted message is superimposed on the captured image. Before displaying such a message, the information terminal determines whether a message exists in the field of view based on information acquired from a built-in electronic compass and an orientation sensor.

According to the conventional message exchange system, the position information attached to the message when the message is posted is the position information of the terminal acquired by the GPS. Thus, if the user captures an image of an advertising sign of a store, inputs "I visit this store frequently." as a message, and posts it, according to this method, the position associated with the message is not the position of the store but the position where the user captured the image. Further, since the information output by the position information acquisition unit and the electronic compass includes some error, there is a possibility of a position error between the posting time and the display time. Thus, the message is not always displayed at the position designated by the poster.

SUMMARY OF THE INVENTION

The present invention is directed to a technique useful for a viewer in recognizing an imaging object when the viewer views a posted image.

According to an aspect of the present invention, an image display apparatus includes a position and orientation detection unit configured to detect a position and orientation of the image display apparatus, a reception unit configured to receive, from a server, a captured image acquired by an imaging apparatus, feature point information of an object included in the captured image, and information of a position and orientation of the imaging apparatus when the imaging apparatus acquired the captured image, a correction unit configured to correct the captured image in a direction corresponding to the position and orientation detected by the position and orientation detection unit based on a three-dimensional structure of the object estimated from the feature point information of the object included in the captured image received by the reception unit and information of the position and orientation of the imaging apparatus when the imaging apparatus acquired the captured image, and a display control unit configured to display the image corrected by the correction unit on a display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8A, 8B, and 8C are examples of flowcharts illustrating processing procedures performed when a shutter button is pressed.

FIG. 9 is a flowchart illustrating an example of processing procedures when message information is transmitted.

DESCRIPTION OF THE EMBODIMENTS

Various exemplary embodiments, features, and aspects of the invention will be described in detail below with reference to the drawings.

According to a first exemplary embodiment of the present invention, a message exchange system employing an augmented reality technique will be described. An information terminal according to the present embodiment is a compact digital camera having a communication function. Further, a message exchange application using the augmented reality technique operates on the information terminal. According to the present embodiment, the message exchange system includes an information terminal of a user and a message exchange server.

Figure 1:
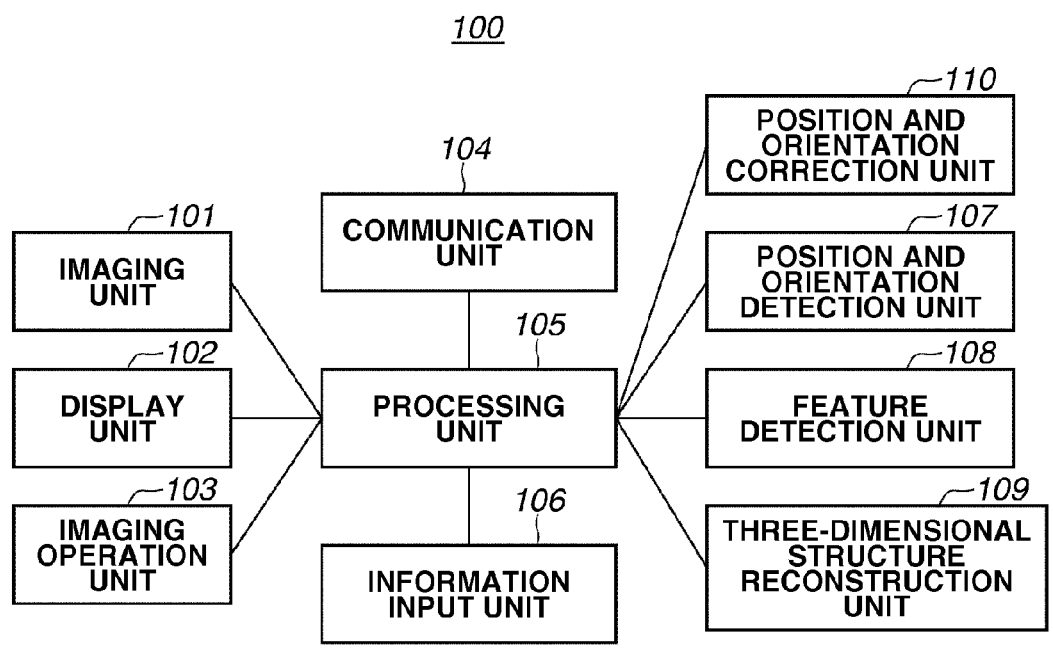
FIG. 1 illustrates a functional configuration example of an information terminal according to an exemplary embodiment of the present invention.

FIG. 1 is a block diagram illustrating an example of a functional configuration of an information terminal 100 according to the present embodiment.

An imaging unit 101 includes a charge-coupled device (CCD) camera module or a complementary metal oxide semiconductor (CMOS) camera module. Further, the imaging unit 101 includes a zoom lens through which light is supplied to the module. An image signal generated by the imaging unit 101 is transmitted to a processing unit 105. A display unit 102 displays a captured image or a message using the augmented reality technique by the display control of the processing unit 105 described below. The display unit 102 includes a liquid crystal display. Further, a transparent touch panel is provided on the liquid crystal display, and the user can touch and operate the information terminal.

An imaging operation unit 103 controls the imaging unit 101 via the processing unit 105. In other words, the user can perform the imaging operation using the imaging operation unit 103. The imaging operation unit 103 includes a shutter button which allows half press and full press. A communication unit 104 controls wireless communication of the information terminal 100. Further, the communication unit 104 can reduce the communications traffic by compressing/decompressing the information which is received/transmitted. The communication unit 104 is realized by a group of microprocessors integrated in the information terminal 100, programs that run on the microprocessors, and a wireless communication module.

The processing unit 105 performs various types of control processing of the information terminal 100. The processing unit 105 is realized by the group of microprocessors integrated in the information terminal 100 and programs that run on the microprocessors. An information input unit 106 is an operation unit which accepts an operation of the user when the user inputs a message or information. The information input unit 106 includes the touch panel, which is provided on the display unit 102. The user can input a text message using the information terminal 100 via a software keyboard and a front-end processor (FEP). The software keyboard and the FEP are controlled by the processing unit 105, which operates in tandem with the information input unit 106.

A position and orientation detection unit 107 detects the position and orientation of the information terminal 100, in other words, the global position of the information terminal and the direction which the information terminal is facing. The position and orientation detection unit 107 includes a GPS module, an electronic compass, and an orientation sensor. A feature detection unit 108 extracts characteristic portions (feature points) from the image captured by the imaging unit 101 and tracks the feature points for each frame which was captured. The feature detection unit 108 is realized by the group of microprocessors integrated in the information terminal 100 and programs that run on the microprocessors.

A three-dimensional structure reconstruction unit 109 reconstructs a three-dimensional structure of a scene as an imaging target by using information of an image captured by the imaging unit 101, information of feature points detected by the feature detection unit 108, and position and orientation information output from the position and orientation detection unit 107. The three-dimensional structure reconstruction unit 109 is realized by the group of microprocessors integrated in the information terminal 100 and programs that run on the microprocessors.

When the information terminal 100 performs the augmented reality display described below, if the information terminal 100 uses only the position and orientation information obtained from the position and orientation detection unit 107 in displaying the CG, a difference with the real scenery may be generated. Such a difference is corrected by a position and orientation correction unit 110. In correcting the difference, the position and orientation correction unit 110 uses information output from the feature detection unit 108 and, in some cases, information output from the three-dimensional structure reconstruction unit 109. The position and orientation correction unit 110 is realized by the group of microprocessors integrated in the information terminal 100 and programs that run on the microprocessors.

Next, the operation of the information terminal of the message exchange system according to the present embodiment will be described.

Figure 2:
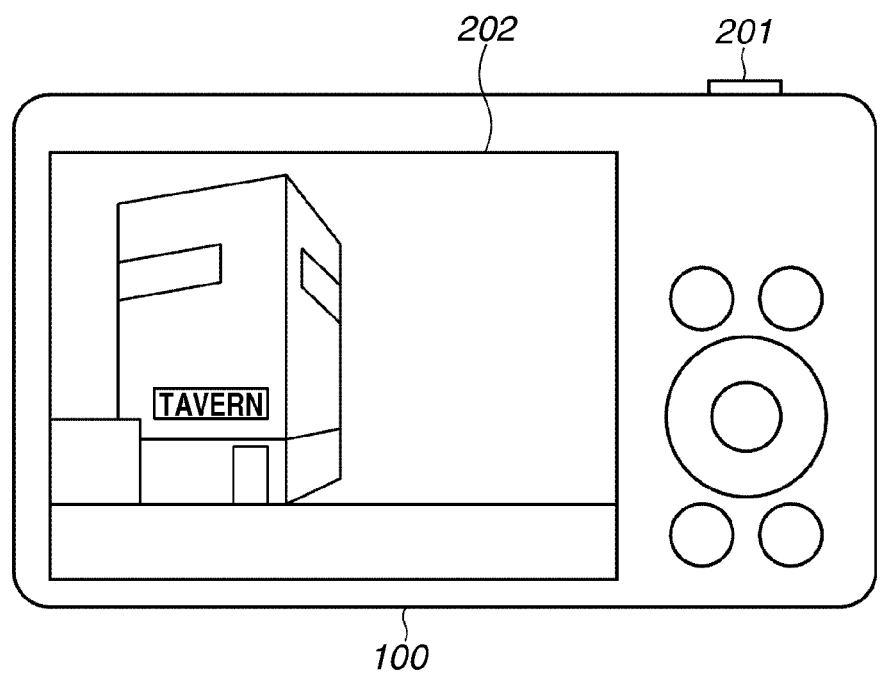
FIG. 2 illustrates an example of an outer appearance of the information terminal according to the exemplary embodiment.

FIG. 2 illustrates an example of an outer appearance of the information terminal 100 according to the present embodiment. As can be seen from FIG. 2, the information terminal 100 has an appearance of a common compact digital camera.

The information terminal 100 includes a shutter button 201 and a liquid crystal touch panel 202 at the rear side. The liquid crystal touch panel 202 functions as the display unit 102 and the information input unit 106. The shutter button 201 allows half-press and full-press operations.

According to the present embodiment, the message exchange application operates on the information terminal 100. When users use this message exchange application, they can input arbitrary text messages and view them. This message exchange application is used for exchanging text messages as well as photographs or position information associated with the text messages.

In the descriptions below, two users being a user A and a user B are using the message exchange application. The user A and the user B are friends and view messages posted by the other user. In the following description, a screen transition of the information terminal used by the user A when the user A views a message posted by the user B will be described.

Figure 3:
FIG. 3 illustrates an example of a screen displayed on a liquid crystal touch panel when a message exchange application is operating according to the exemplary embodiment.

FIG. 3 illustrates an example of the operation screen of the message exchange application according to the present embodiment. More precisely, FIG. 3 illustrates a screen displayed on the liquid crystal touch panel 202 of the information terminal 100 as an image display apparatus. When messages are displayed using this message exchange application, messages input by other users are displayed in reverse chronological order. The screen in FIG. 3 is displayed when the user A views messages input by the user B. The message 301 is the latest message input by the user B. Further, messages 302 and 303 are those input by the user B before the message 301. These messages are downloaded from the message exchange server to the information terminal 100 when the message exchange application is started by the user A.

Each of a photograph icon 304, a map icon 305, and an augmented reality icon 306 displayed in the field of the message 301 being the latest message is an icon for changing the mode so that the information transmitted by the user B in association with the message 301 can be viewed. The photograph icon 304 is displayed if a photograph is attached to the message posted by the user B. If the user A touches the photograph icon 304, a photograph which was taken when the user B input the message 301 is downloaded from the message exchange server, and the photograph is displayed on the liquid crystal touch panel 202.

Figure 4:
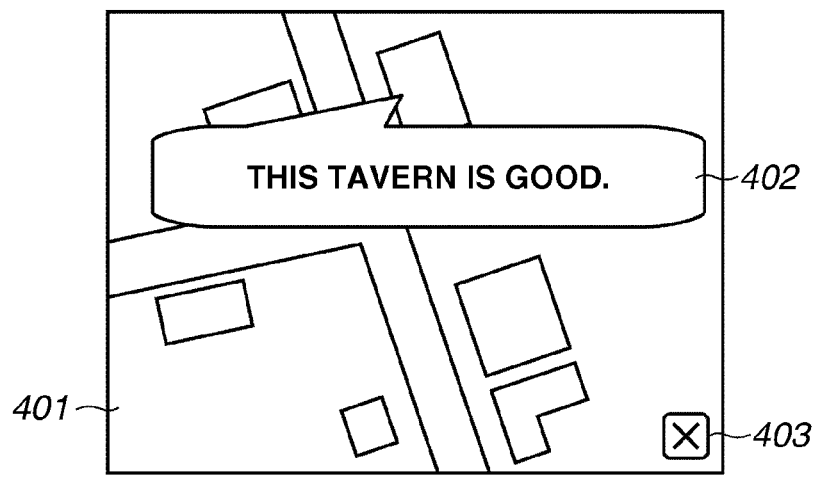
FIG. 4 illustrates an example of a map of where a message was input, which is displayed when a map icon is touched.

The map icon 305 is displayed if position information is attached to the message posted by the user B. If the user A touches the map icon 305, a screen as the one illustrated in FIG. 4 is displayed on the liquid crystal touch panel 202. A map screen 401 includes the position where the user B input the message 301. Further, the tail of the balloon of a message 402 of the user B is pointing the position where the user B input the message 301. A close icon 403 is provided for closing the display of the map. If the user touches the close icon 403, the map display ends and the screen illustrated in FIG. 3 is displayed again.

Figure 5A:
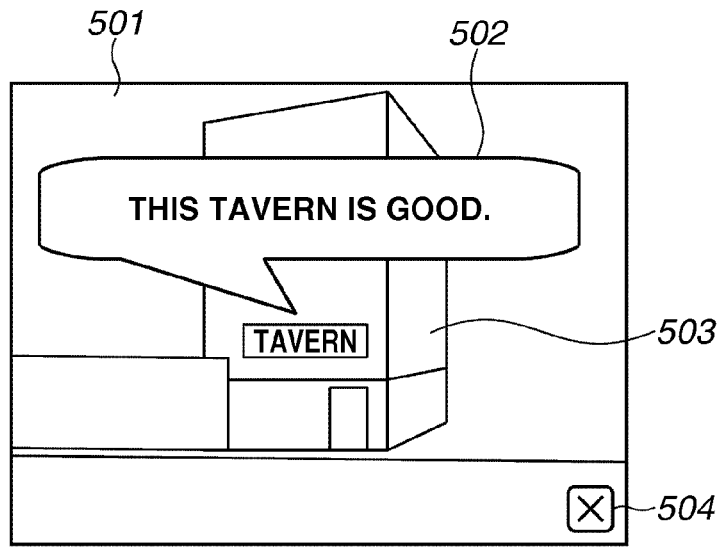
FIGS. 5A and 5B illustrate examples of a live scene imaged by the information terminal, which is displayed when an augmented reality icon is selected according to the exemplary embodiment.

The augmented reality icon 306 is displayed if feature point information was posted together with a message by the user B and if the user A is in an augmented reality display corresponding range described below. If the user A touches the augmented reality icon 306, a screen such as the one illustrated in FIG. 5A is displayed on the screen.

Figure 5B:
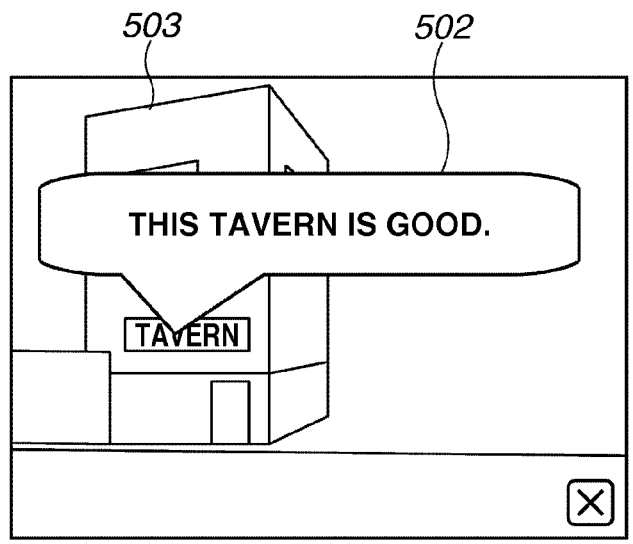

A scene 501 is a live scene. The user A is viewing this scene via the information terminal 100. A message 502 is a message input by the user B. The message 502 was posted in association with a building 503 as the main object in the scene 501. Even if the user A moves the information terminal 100 and changes the range of imaging, as illustrated in FIG. 5B, the message 502 is set to the building 503. The control of the message display will be described below. Further, if the user A touches a close icon 504, the augmented reality display ends, and the screen illustrated in FIG. 3 is displayed again.

Next, the processing performed by the information terminal 100 when the user B posts a message will be described. In the following description, the user B posts the messages 301 to 303 illustrated in FIG. 3 with a certain time interval.

Figure 6:
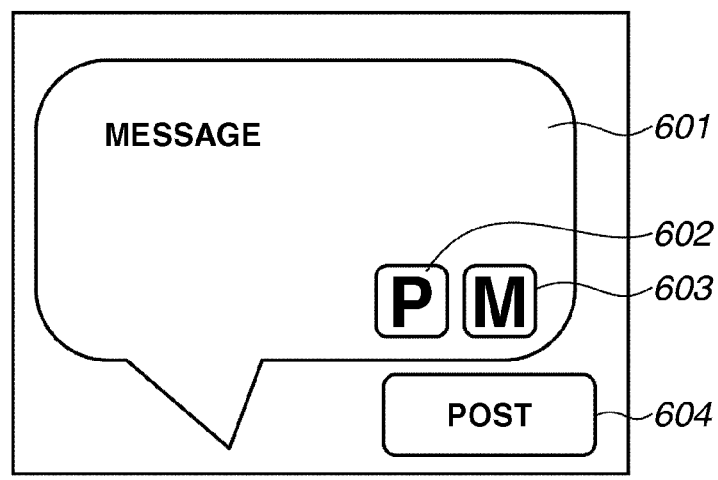
FIG. 6 illustrates an example of a screen used for inputting a text message.

First, if the user B starts the message exchange application on the information terminal 100, a screen such as the one illustrated in FIG. 3 is displayed on the information terminal 100. Then, if the user B touches a message post icon 307 to post a message, a screen as the one illustrated in FIG. 6 is displayed on the information terminal 100.

If the user B touches a message input field 601, a software keyboard is displayed on the screen, and the user inputs a text message. When the user B finishes inputting the text message and touches a posting determination icon 604, the input text message is transmitted to the message exchange server by wireless communication. According to these procedures, the user B inputs the messages 302 and 303.

Next, if the user B desires to post a photograph and position information in association with the next message (message 301), the user B touches a map icon 603 before inputting the message 301. If the map icon 603 is touched, the position and orientation information of the information terminal 100 is obtained by the position and orientation detection unit 107. The obtained information is associated with the message when it is posted. Next, if the user B touches a photograph icon 602, a screen illustrated in FIG. 7A is displayed on the information terminal 100.

Figure 7A:
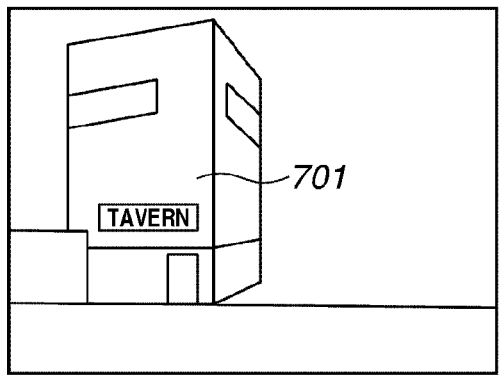
FIGS. 7A, 7B, 7C, 7D, and 7E are examples of the display screen displayed when imaging is performed.

FIG. 7A illustrates a live scene viewed by the user B using the information terminal 100 via the imaging unit 101 as an imaging apparatus. In this situation, the user B desires to capture an image of a building 701 by using the information terminal 100 and post a message associated with the building 701.

Before capturing the image of the building 701, the user B half-presses the shutter button 201. Then, the focus adjustment function of the zoom lens operates, and the building 701 is focused. At that time, a focus frame 703 is displayed. The focus frame 703 is controlled by a method used for a normal compact digital camera. Further, when the user B half-presses the shutter button, the feature detection unit 108 operates to detect feature points of the image.

Figure 7B:
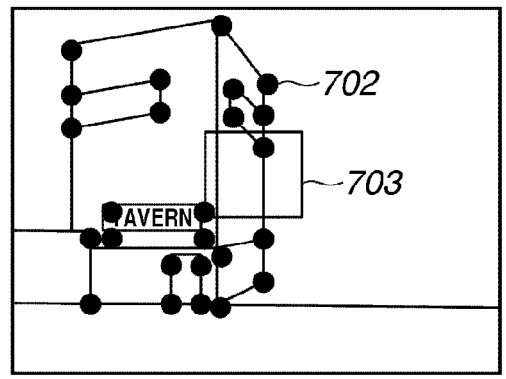
Figure 7C:
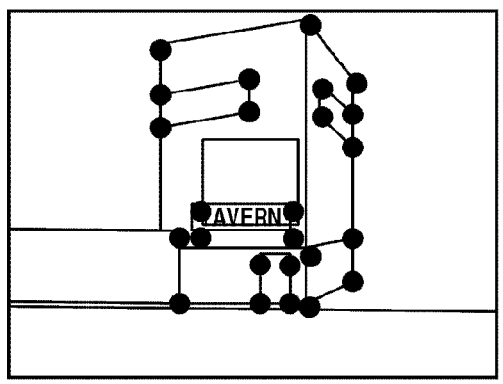

FIG. 7B illustrates the image with the visualized feature points. A feature point mark 702 is displayed for each feature point on the screen. As illustrated in FIG. 7C, if the user B changes the imaging range, the feature point mark 702 also moves with the imaging range.

According to the present embodiment, although the feature point mark 702 is displayed on the screen, the feature point is not necessarily visualized. It can be processed as background processing of the imaging. Further, although there are various methods for tracking the feature points, a method that detects a local feature and tracks the detected local feature for each frame will be used according to the present embodiment. This method is discussed in Realtime Mobile AR with Fast Object Recognition Framework: Yuichi Yoshida, Mitsuru Anbai, Information Processing Society of Japan, Symposium Interaction 2011 (Literature 1), and Parallel Tracking and Mapping on a Camera Phone: Georg Klein, David Murray, In Proc. International Symposium on Mixed and Augmented Reality, 2009 (Literature 2).

Figure 7D:
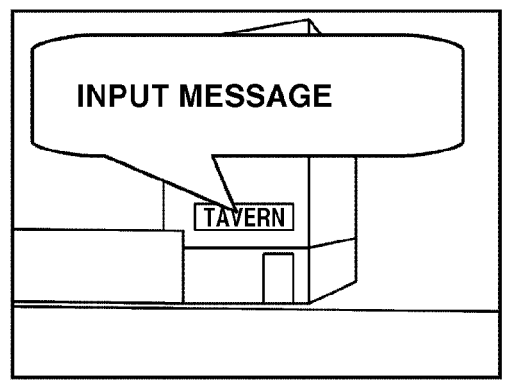

If the user B sets the imaging range by placing the object of interest at the center as illustrated in FIG. 7C, half-presses the shutter button 201, and then fully-presses the shutter button 201, the photograph is captured and the imaging screen is fixed. Then, as illustrated in FIG. 7D, a message input field is displayed on the screen. The user B can input a message in this message input field in a manner similar to the way the user B inputs a message in the message input field 601 illustrated in FIG. 6. Further, the user B can adjust the position of the message by operating the message input field.

Figure 7E:
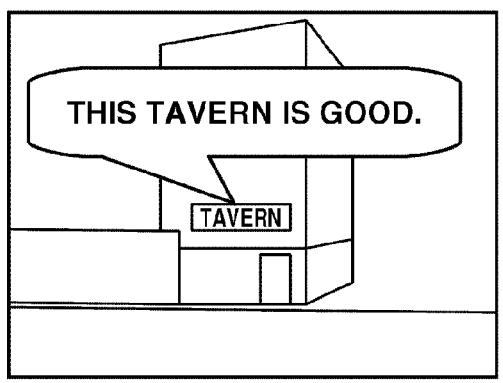

While the user B inputs the text message such as the one illustrated in FIG. 7E, the three-dimensional structure reconstruction unit 109 reconstructs the three-dimensional structure of the imaging target using the tracking result of the feature points. Recovering a three-dimensional structure from a moving image is generally called Structure From Motion. Although various methods are proposed for the Structure From Motion, the method discussed in the following literature is used according to the present embodiment. Interactive Modeling for AR Applications: John Bastian et al., In Proc. International Symposium on Mixed and Augmented Reality, 2010 (Literature 3). According to this method, after feature points of a moving image are tracked, a three-dimensional motion of the imaging unit that captured the moving image during the imaging is calculated. Further, the region of the imaging object designated by the user in the moving image is automatically tracked. Then, the three-dimensional structure of the imaging object is reconstructed by using the obtained information.

According to the reconstruction of the three-dimensional structure of the present embodiment, the tracking of the feature points is performed while the user is half-pressing the shutter button and the Structure From Motion is performed while the user inputs the message. FIG. 8A is a flowchart illustrating an example of the processing which is started when the user operates the shutter button 201. In step S801, the processing unit 105 determines whether the shutter button 201 is half-pressed. If the shutter button 201 is half-pressed (YES in step S801), the processing proceeds to step S802. If the shutter button 201 is not half-pressed (NO in step S801), step S801 is repeated. In step S802, the feature detection unit 108 performs tracking of the feature points. In step S803, the processing unit 105 determines whether the shutter button 201 is fully-pressed. If the shutter button 201 is fully-pressed (YES in step S803), the processing proceeds to step S804. If the shutter button 201 is not fully-pressed (NO in step S803), step S803 is repeated. In step S804, the three-dimensional structure reconstruction unit 109 performs the Structure From Motion.

According to the information terminal 100 of the present embodiment, the three-dimensional structure can be reconstructed by a method different from the above-described method. An example is illustrated in the flowchart in FIG. 8B. In step S821, the processing unit 105 determines whether the shutter button 201 is half-pressed. If the shutter button 201 is half-pressed (YES in step S821), the processing proceeds to step S822. If the shutter button 201 is not half-pressed (NO in step S821), step S821 is repeated. In step S822, only the imaging of the moving image is performed and the tracking of the feature points is not performed. In step S823, the processing unit 105 determines whether the shutter button 201 is fully-pressed. If the shutter button 201 is fully-pressed (YES in step S823), the processing proceeds to step S824. If the shutter button 201 is not fully-pressed (NO in step S823), step S823 is repeated. In step S824, the feature detection unit 108 extracts the feature points from the recorded moving image and tracks the feature points which have been recorded while the message is input. The feature points are tracked backward from the time the image was captured. The feature detection unit 108 goes back in time until the three-dimensional structure information can be reconstructed.

If the information terminal 100 has enough calculation capability, the procedures in the flowchart illustrated in FIG. 8C can be followed. In step S841, the processing unit 105 determines whether the shutter button 201 is half-pressed. If the shutter button 201 is half-pressed (YES in step S841), the processing proceeds to step S842. If the shutter button 201 is not half-pressed (NO in step S841), step S841 is repeated. In step S842, the tracking of the feature points by the feature detection unit 108 and the Structure From Motion by the three-dimensional structure reconstruction unit 109 are simultaneously performed. In step S843, the processing unit 105 determines whether the shutter button 201 is fully-pressed. If the shutter button 201 is fully-pressed (YES in step S843), the processing proceeds to step S844. If the shutter button 201 is not fully-pressed (NO in step S843), step S843 is repeated. In step S844, a still image is captured.

According to the present embodiment, the three-dimensional structure information obtained from the three-dimensional structure reconstruction can be utilized in various ways so long as the requirement of the present embodiment is satisfied. For example, the information can be recorded as Point Cloud Data, which is data of a three-dimensional position of each of the feature points. Further, the information can be recorded as Mesh Data, which is a collection of surfaces based on characteristic points in a scene. Further, the information can be recorded as Solid Data, which is data of a three-dimensional object predicted from Mesh Data in a scene. Further, the three-dimensional structure information is not limited to geometric information of a point, a surface, or a three-dimensional object, and may include color or material information such as color of point, texture of surface, and reflection characteristics. A common expression used in the world of CG, computer-aided design (CAD), and geographic information system (GIS) can be used for the three-dimensional expression of the three-dimensional structure.

When the user B finishes the input of the text message, the information detected or reconstructed during the process is transmitted to the message exchange server together with and in association with the message input by the user B. FIG. 9 is a flowchart illustrating an example of the processing for attaching information to a text message and transmitting the information-attached text massage by the control of the processing unit 105.

The processing of the flowchart in FIG. 9 is started when the posting determination icon 604 is touched by the user B. In step S901, the processing unit 105 determines whether the position and orientation information has been acquired by the position and orientation detection unit 107 using the GPS module. If the position and orientation information is not acquired (NO in step S901), the processing proceeds to step S902. In step S902, the processing unit 105 attaches a photograph, which was taken in association with the text message, to the text message. In step S908, the communication unit 104 compresses the data of the photograph and transmits it to the message exchange server. If the user A views this message posted by the user B, only the photograph icon 304 is displayed and the map icon 305 and the augmented reality icon 306 are not displayed in the field of the message 301 in FIG. 3. The compression method used in step S908 can be a common method used for compressing photographs and, for example, Joint Photographic Experts Group (JPEG) compression can be used.

On the other hand, as a result of the determination in step S901, if the position and orientation information is acquired (YES in step S901), the processing proceeds to step S903. In step S903, the feature detection unit 108 determines whether a sufficient number of feature points have been extracted from the captured image. In the stage of the screen illustrated in FIG. 7C, if the image captured by the user B is a featureless white wall, feature points cannot be extracted from the captured image. According to the present embodiment, the number of feature points in the captured image considered as sufficient is ten or more. The number of feature points, however, is not limited to the above-described example and, for example, a criterion such as "five or more feature points within a radius of 100 pixels from the message input position" can be used.

As a result of the determination in step S903, if a sufficient number of feature points have not been extracted from the captured image (NO in step S903), the processing proceeds to step S904. In step S904, the processing unit 105 attaches the photograph which was taken in association with the text message and the acquired position and orientation information. In step S908, the communication unit 104 compresses the information and transmits it to the message exchange server. If the user A views this message posted by the user B, the photograph icon 304 and the map icon 305 are displayed but the augmented reality icon 306 is not displayed in the field of the message 301 illustrated in FIG. 3. In this step, since the information amount of the position and orientation information is small, the information can be transmitted without compression.

On the other hand, as a result of the determination in step S903, if a sufficient number of feature points have been extracted (YES in step S903), the processing proceeds to step S905. In step S905, the three-dimensional structure reconstruction unit 109 determines whether a three-dimensional structure of the imaging target has been reconstructed. In principle, if there is little change in the range of the imaging of the imaging unit 101 while the screen illustrated in FIG. 7B is changed to the screen illustrated in FIG. 7C, in other words, while the tracking of the feature points is being performed, the three-dimensional structure of the imaging target cannot be reconstructed.

As a result of the determination in step S905, if the three-dimensional structure of the imaging target cannot be reconstructed from the tracking result of the feature points (NO in step S905), the processing proceeds to step S906. In step S906, the processing unit 105 attaches the photograph which was taken in association with the text message, the position and orientation information, and the feature point information of the captured image. In step S908, the communication unit 104 compresses the information and transmits it to the message exchange server. If the user A views this message posted by the user B, the photograph icon 304, the map icon 305, and the augmented reality icon 306 are displayed in the field of the message 301 illustrated in FIG. 3. In this step, since the information amount of the feature point information is small, the information can be transmitted without compression.

On the other hand, as a result of the determination in step S905, if a three-dimensional structure of the imaging target is reconstructed (YES in step S905), the processing proceeds to step S907. In step S907, the processing unit 105 attaches the photograph which was taken in association with the text message, the position and orientation information, the feature point information of the captured image, and the three-dimensional structure information of the imaging target. In step S908, the communication unit 104 compresses the information and transmits the compressed information to the message exchange server. If the user A views this message posted by the user B, the photograph icon 304, the map icon 305, and the augmented reality icon 306 are displayed in the field of the message 301 illustrated in FIG. 3. In step S908, a common high speed compression method can be used in compressing the three-dimensional structure information.

Although the information attached in steps S906 and S907 is different, in either case, the user A can view the message posted by the user B using the augmented reality display via the information terminal 100 as illustrated in FIG. 5A. However, the augmented reality display according to the information attached in step S906 and the augmented reality display according to the information attached in step S907 are different with respect to the augmented reality display corresponding range where the user A can experience the augmented reality display. This augmented reality display corresponding range will be described below.

Figure 10A:
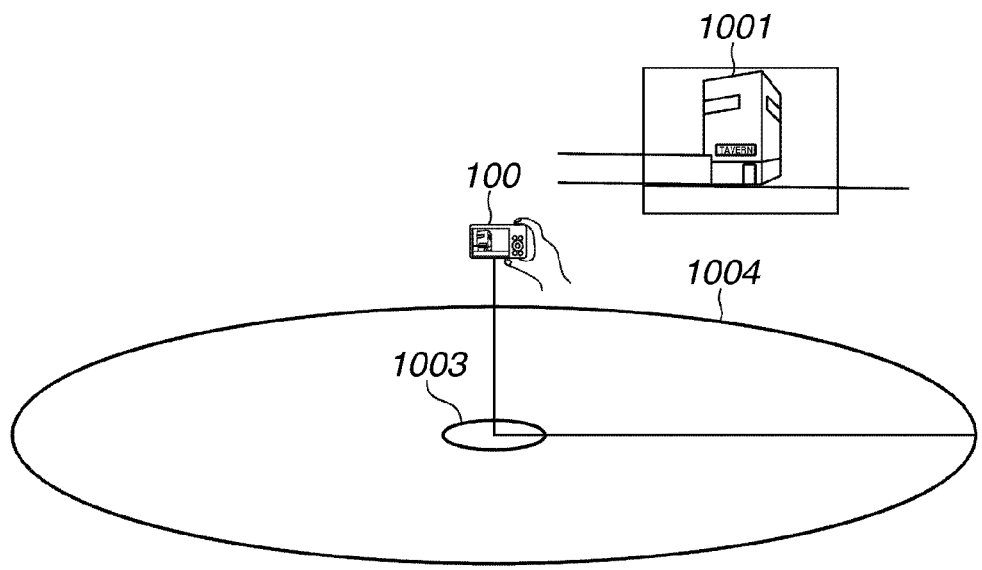
FIGS. 10A and 10B illustrate an augmented reality display corresponding range corresponding to an augmented reality display.

FIG. 10A illustrates an augmented reality display corresponding range 1004 corresponding to the augmented reality display according to the information attached in step S906. The example in FIG. 10A illustrates a case where the user A performs imaging of an imaging object 1001 by the information terminal 100. The imaging object 1001 is a target object and corresponds to the message input by the user B. A current position 1003 of the user A can be acquired from latitude/longitude information obtained by the position and orientation detection unit 107 of the information terminal 100. According to the present embodiment, the augmented reality display corresponding range 1004 is in the range of a radius of 10 meters from the current position 1003 of the user A.

According to the processing in step S906, the feature point information extracted from the captured image is attached to the message. This feature point information is information extracted from an image of an imaging object captured by the user B from an imaging position. If the position of the imaging object is greatly different from the imaging position of the user A, the imaging object which the user A sees will be greatly different and the feature point information extracted from the captured image will be greatly different. The augmented reality display corresponding range 1004 is determined considering such an effect and is set on the basis that the feature points of the imaging object are not greatly changed if the imaging position when the message was posted is not greatly distant from the position of the user A.

According to the present embodiment, the augmented reality display corresponding range 1004 is set to the range of a radius of 10 meters from the current position 1003 of the user A. However this range can be changed. For example, if the information terminal is an ordinary compact digital camera, the focus position can be determined by a contrast method when the imaging is performed and the distance to the imaging object can be calculated using the focal length of the lens at the time of imaging. Further, the radius can be adjusted according to the distance. In other words, if the imaging object is close, a smaller radius can be used. If the imaging object is far, a greater radius can be used. Further, the distance to the imaging object can be obtained according to the depth from defocus method when an autofocus operation according to the contrast method is performed at the time of imaging. Information of the distance to the imaging object is added to the captured image as imaging information of the captured image.

Figure 10B:
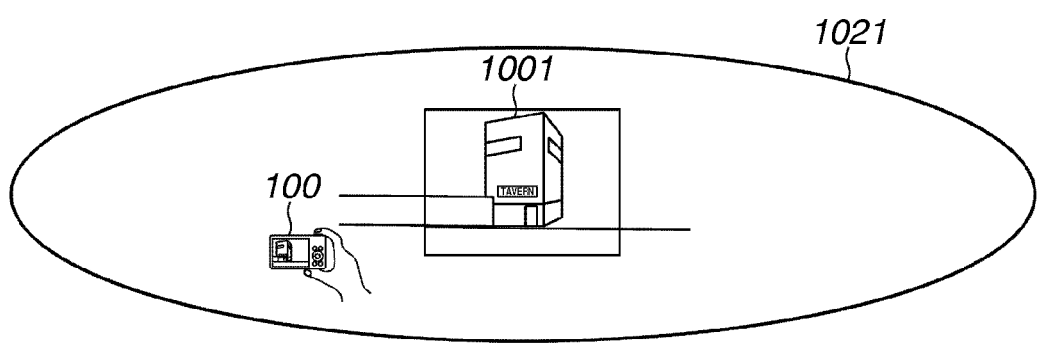

FIG. 10B illustrates an augmented reality display corresponding range 1021 corresponding to the augmented reality display according to the information attached in step S907. According to the present embodiment, the augmented reality display corresponding range 1021 is in the range of a radius of 30 meters from the imaging object.

According to the processing in step S907, the three-dimensional structure information of the imaging object is attached to the message. If this three-dimensional structure information is attached, even if the position of the user A is distant from the imaging position of the user B taken when the message was posted, the imaging object of the posted message is identified, and a message corresponding to the augmented reality display can be displayed.

Figure 11:
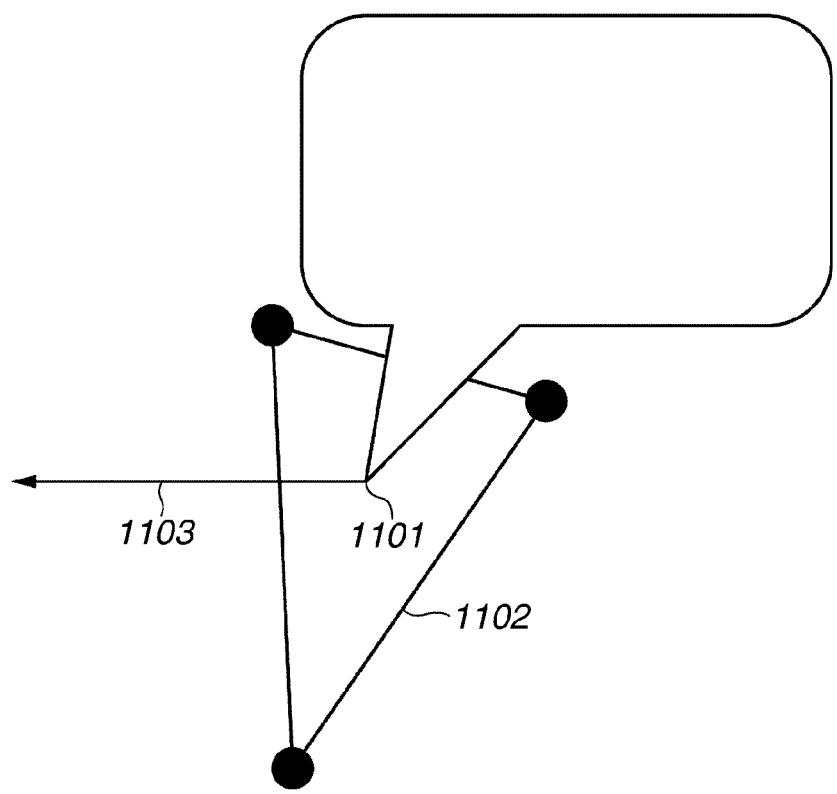
FIG. 11 illustrates a three-dimensional mesh closest from a posting designated position.
Figure 12:
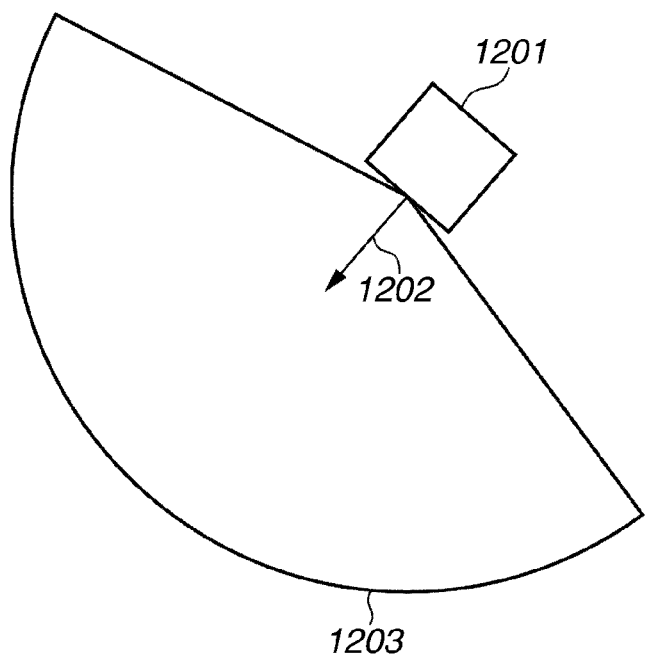
FIG. 12 illustrates another example of the augmented reality display corresponding range.

According to the present embodiment, the augmented reality display corresponding range 1021 is set in the range of a radius of 30 meters from the imaging object. However, this range can be changed. For example, as illustrated in FIG. 11, information of a message posting designated position 1101 is searched from three-dimensional structure information and a three-dimensional mesh 1102 which is closest to the message posting designated position 1101 is identified. Further, a normal line direction 1103 of the three-dimensional mesh 1102 is calculated. Then, as illustrated in FIG. 12, with respect to an imaging object 1201, a direction 1202, which is the direction of the normal line direction 1103 seen from above with respect to the direction of gravitational force, is obtained. Then, the inside of a sector 1203 with a radius of 30 meters and a central angle of 150 degrees and having the direction 122 as the center line can be set as the augmented reality display corresponding range. Further, the radius of the sector 1203 can be adjusted according to the size of the reconstructed three-dimensional structure. In this manner, by determining the condition of the augmented reality display corresponding range, when the user A desires to perform the augmented reality display of a message, the user A can discover the defined three-dimensional structure information in the field of view and perform the augmented reality display of message more easily.

Next, the use of the augmented reality display corresponding range set in this manner in the information terminal 100 of the user A which displays the messages will be described with reference to drawings.

Figure 13:
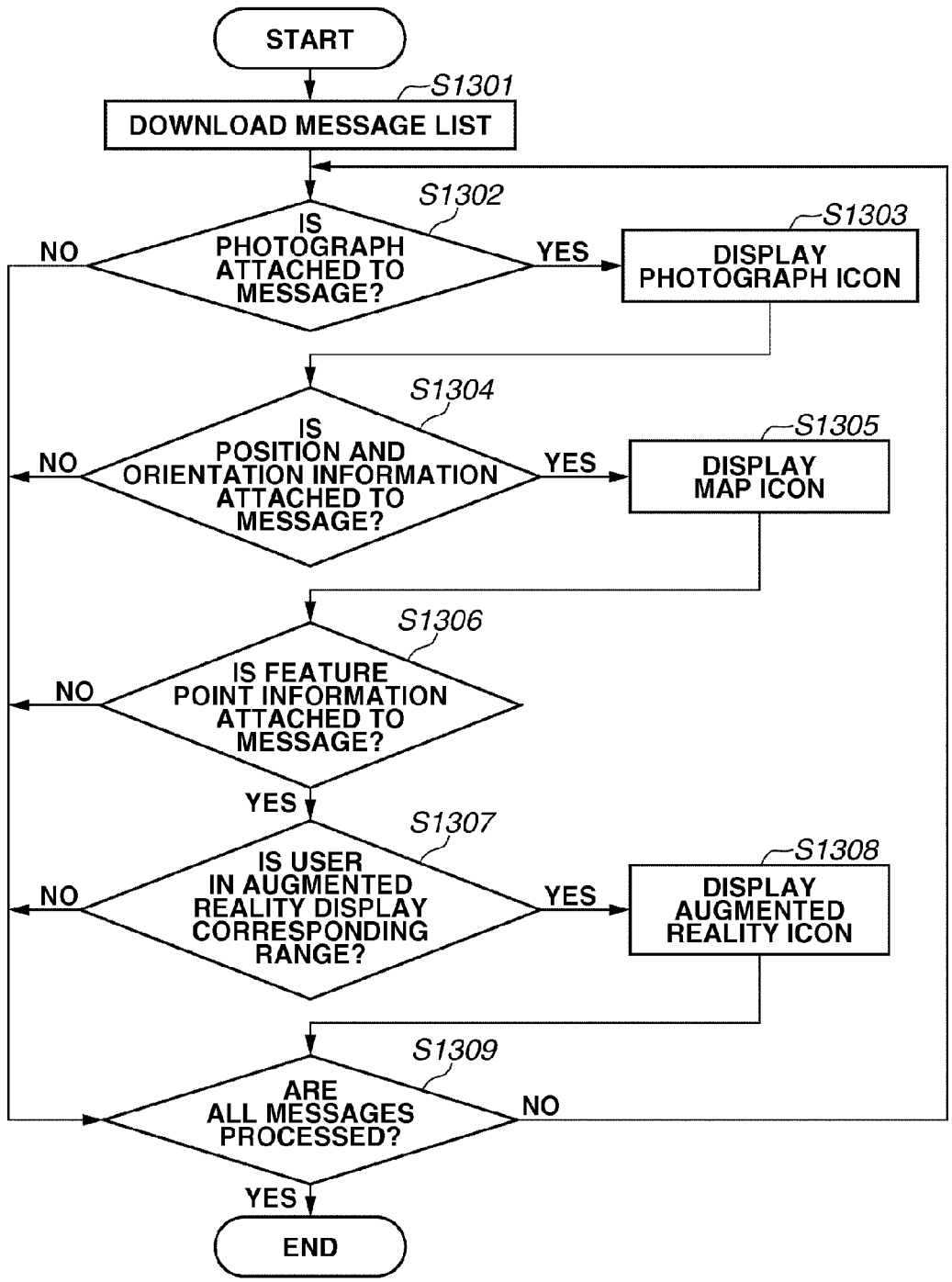
FIG. 13 is a flowchart illustrating procedures for displaying an operation screen of the message exchange application according to the exemplary embodiment.

FIG. 13 is a flowchart illustrating the procedures used for displaying an operation screen of the message exchange application, such as the one illustrated in FIG. 3, on the information terminal 100 of the user A. The processing in FIG. 13 is executed by the processing unit 105 and started when the message displayed by the message exchange application used by the user A is updated. The display message is updated when the user A starts the message exchange application. After that, the update is performed at a fixed time interval. According to the present embodiment, the update is performed every one minute.

In step S1301, when the update of the display message is started, the communication unit 104 downloads a list of messages from the message exchange server. The list of messages which is downloaded is compressed in advance by the message exchange server. After the list is downloaded, the list of messages is decompressed by the communication unit 104. The poster of the messages is a user whose messages the user A desires to see. Such a user is determined by the user A in advance. According to the present embodiment, the downloaded messages are those posted by the user B. Further, the number of messages which are downloaded is counted from the latest message which was posted. The number of messages is determined to a predetermined number. According to the present embodiment, the number is 20.

Next, the determination described below is performed from the latest message which was downloaded. In step S1302, the processing unit 105 determines whether a photograph is attached to the message. If a photograph is attached to the message (YES in step S1302), the processing proceeds to step S1303. In step S1303, the processing unit 105 displays the photograph icon 304. Then, the processing proceeds to step S1304. On the other hand, as a result of the determination in step S1302, if a photograph is not attached to the message (NO in step S1302), the processing proceeds to step S1309.

In step S1304, the processing unit 105 determines whether position and orientation information is attached to the message. If position and orientation information is attached to the message (YES in step S1304), the processing proceeds to step S1305. In step S1305, the processing unit 105 displays the map icon 305. Then, the processing proceeds to step S1306. On the other hand, as a result of the determination in step S1304, if position and orientation information is not attached to the message (NO in step S1304), the processing proceeds to step S1309.

In step S1306, the processing unit 105 determines whether feature point information is attached to the message. If feature point information is attached to the message (YES in step S1306), the processing proceeds to step S1307. If feature point information is not attached to the message (NO in step S1306), the processing proceeds to step S1309.

In step S1307, the processing unit 105 determines whether the user A is in the augmented reality display corresponding range of the message. This determination is made according to whether the position of the user A detected by the position and orientation detection unit 107 is in the augmented reality display corresponding range described above. As a result of the determination, if the user A is in the augmented reality display corresponding range of the message (YES in step S1307), the processing proceeds to step S1308. In step S1308, the processing unit 105 displays the augmented reality icon 306. Then, the processing proceeds to step S1309. On the other hand, as a result of the determination in step S1307, if the user A is not in the augmented reality display corresponding range of the message (NO in step S1307), the processing proceeds to step S1309.

In step S1309, the processing unit 105 determines whether the determination on and after step S1302 has been performed for all the messages which were downloaded. As a result of the determination, if a message not yet subjected to the determination exists (NO in step S1309), the processing returns to step S1302, and the processing of the next latest message will be performed. On the other hand, if the determination of all the messages are finished (YES in step S1309), the processing ends.

Figure 14:
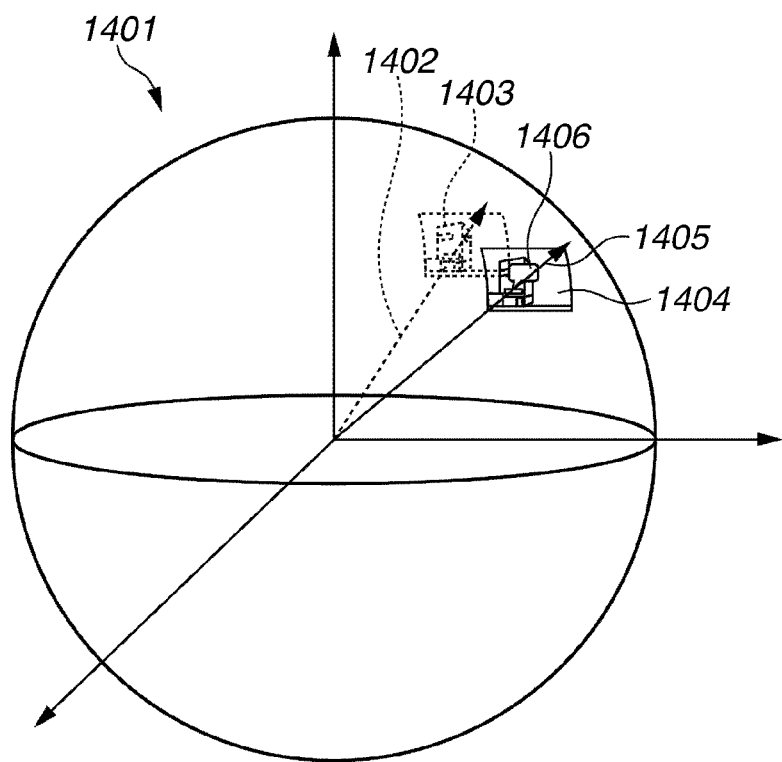
FIG. 14 illustrates how an augmented reality display of message is controlled according to the exemplary embodiment.

Next, the control method of the augmented reality display such as the one illustrated in FIGS. 5A and 5B when the user is in the augmented reality display corresponding range will be described. FIG. 14 is a conceptual diagram of how the augmented reality display of a message is controlled when the user A is in the augmented reality display corresponding range illustrated in FIG. 10A.

FIG. 14 illustrates a polar coordinate system 1401 having the location of the user A at the center. An arrow 1402 indicates a direction of the location where the user B posted the message. This direction is obtained from the position and orientation information which was downloaded together with the message. The position and orientation information indicates the direction of the imaging of the photograph attached to the message posted by the user B. Further, the position and orientation information is obtained by the position and orientation detection unit 107 of the information terminal 100 of the user B taken when the photograph was taken.

A feature point 1403 is a feature point which is assumed to be in the direction of the feature point of the photograph attached to the message posted by the user B. However, the position at which the user B performed imaging does not accurately match the current position of the user A. Further, since an error may be included in the detection result of the position and orientation detection unit 107 of the information terminal 100, this direction is different from the direction of a scenery 1404 actually viewed by the user A indicated by an arrow 1405.

Thus, according to the present embodiment, the position and orientation correction unit 110 of the information terminal 100 performs the correction using the feature points and displays a message in conformity with a position 1406 where the user B posted the message. Such a correction of the display direction of CG using feature points in an image can be performed by a method discussed in, for example, Proposal for reality recognition type information terminal uScope: Tetsushi Watanabe, 2010 second Tron/Ubiquitous Society. This method is employed in many augmented reality systems.

Figure 15:
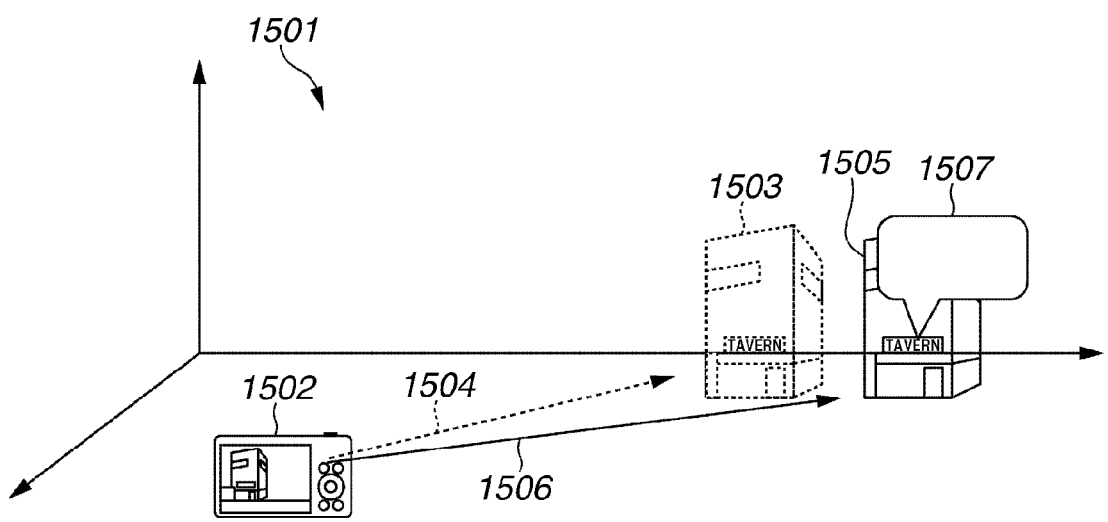
FIG. 15 illustrates how an augmented reality display of message is controlled according to the exemplary embodiment.

FIG. 15 is a conceptual diagram of how an augmented reality display of a message is controlled when the user A is in the augmented reality display corresponding range illustrated in FIG. 10B. In FIG. 15, the current position and orientation of the information terminal 100 of the user A is at a position 1502 in an orthogonal coordinate system 1501. Further, a coordinate position 1503 is a position where a reconstructed three-dimensional structure of an imaging target mathematically exists. This target is the target of the message posted by the user B. Further, an arrow 1504 indicates the direction of the coordinate position 1503 from the user A at the position 1502.

Since the results of the detection obtained from the position and orientation detection unit 107 of the information terminal 100 of the user A and the information terminal 100 of the user B include an error, the direction of the arrow 1504 is different from the direction in which the user A actually sees an object body 1505 indicated by an arrow 1506.

Thus, according to the present embodiment, the position and orientation correction unit 110 of the information terminal 100 performs correction using the feature point and the three-dimensional structure reconstruction. Then, a message is displayed according to a position 1507 where the user B posted the message. Such a correction of the display direction of CG using the three-dimensional structure in a scene can be performed according to, for example, the method discussed in Literatures 2 and 3. The method is generally employed in many augmented reality systems.

According to the present embodiment, both the feature detection and the three-dimensional structure reconstruction are performed by the information terminal 100. However, such processing is not necessarily performed by the information terminal 100. For example, moving image data can be transmitted to the message exchange server and processing of the data can be performed by the message exchange server.

Further, according to the present embodiment, the feature point detection processing and the three-dimensional structure reconstruction processing performed by the information terminal 100 are executed according to half-press or full-press of the shutter button. However, such processing can be performed by using a newly-provided physical button or an icon on the display screen, or according to an instruction by a control mechanism of, for example, a power button. Further, in place of using a control mechanism, for example, a mechanism based on gesture can be used. According to this mechanism, for example, if a user holds a camera to capture an image, the motion is detected by an orientation sensor, and the feature point detection processing is started. Further, a mode used for posting only a photograph and message information and not performing the feature detection or the three-dimensional structure reconstruction can be provided in addition to a posting mode compatible with the augmented reality display.

Further, an object recognition unit may be included in the information terminal 100 of the present embodiment. In addition to the face recognition technique which is already common, the object recognition unit classifies a type of an object in an image using various image recognition algorithms such as the one discussed in The Current State and Future Directions on Generic Object Recognition: Keiji Yanai, Journal of Information Processing, The computer Vision and Image Media, Vol. 48, November 2007. Further, if individual recognition of humans and animals is performed using a method, for example, discussed in Japanese Patent Application Laid-Open No. 2008-9914, and if their individual names are identified, text data of the names is generated. Then, the generated text data is associated with the image. In order to realize such a function, the object recognition unit includes an individual database or an object database used for classifying objects.

If the object recognition unit is provided, the object recognition unit operates in the stage of the display screen illustrated in FIG. 7D, and the result of the recognition is input in advance in the message input field. According to this processing, the user can reduce the input time. Further, even if the user does not know the name of the imaging object, the time and effort for finding out the name can be reduced.

Further, the function of such an object recognition unit can be provided by the message exchange server in place of the information terminal 100. In that case, the object recognition unit performs the object recognition using the image data, the feature point information, or the three-dimensional structure information transmitted from the information terminal 100. Further, in addition to the object recognition, by acquiring information of the area using the transmitted position and orientation information and, for example, the Internet, names of stores and facilities not included in the database can be input in advance as a part of the message.

According to the present embodiment, on the side of the user A, the captured image is corrected to match the view point of the user A based on the feature point information or the three-dimensional structure information. Thus, the viewer can recognize the imaging object more easily when the viewer views the posted image.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-025412 filed Feb. 8, 2012, which is hereby incorporated by reference herein in its entirety.

What is claimed is:

1. An image display apparatus comprising:
at least one processor and at least one memory coupled to each other and cooperating to act as:

a position and orientation detection unit configured to detect a position and orientation of the image display apparatus;

a reception unit configured to receive, from a server, a captured image acquired by an imaging apparatus, feature point information of an object included in the captured image, information of a position and orientation of the imaging apparatus when the imaging apparatus has acquired the captured image, and three-dimensional structure information of the object estimated from the feature point information of the object included in the captured image;

a setting unit configured to set a first range as a first predetermined range in a case where the reception unit has not received the three-dimensional structure information of the object, and set a second range as a second predetermined range in a case where the reception unit has received the three-dimensional structure information of the object:

a determination unit configured to determine whether the position detected by the position and orientation detection unit exists within the first and the second predetermined ranges from a position of the object or not;

a correction unit configured to correct the captured image in a direction corresponding to the position and orientation detected by the position and orientation detection unit, based on the feature point information of the object and the information of the position and orientation of the imaging apparatus when the imaging apparatus has acquired the captured image in a case where the first range has been set by the setting unit and the determination unit has determined that the position detected by the position and orientation detection unit exists within the first predetermined range from the position of the object, and correct the captured image based on the three-dimensional structure information of the object in a case where the second range has been set by the setting unit and the determination unit has determined that the position detected by the position and orientation detection unit exists within the second predetermined range from the position of the object; and a display control unit configured to display the image corrected by the correction unit on a display unit, wherein the first range is smaller than the second range.

2. A system including an imaging apparatus and an image display apparatus, the imaging apparatus comprising:
at least one processor and at least one memory coupled to each other and cooperating to act as:
an imaging unit configured to perform imaging of an object;
a first position and orientation detection unit configured to detect a position and orientation of the imaging apparatus when the imaging of the object is performed by the imaging unit;
a feature point detection unit configured to detect a feature point of the object included in a captured image generated by the imaging unit; and
a transmission unit configured to transmit the captured image and information of the position and orientation detected by the first position and orientation detection unit and the feature point detected by the feature point detection unit to a server, and the image display apparatus comprising:
a second position and orientation detection unit configured to detect a position and orientation of the image display apparatus;

a reception unit configured to receive, from the server, the captured image, feature point information of the object included in the captured image, information of the position and orientation of the imaging apparatus when the imaging apparatus has acquired the captured image, and three-dimensional structure information of the object estimated from the feature point information of the object included in the captured image;

a setting unit configured to set a first range as a first predetermined range in a case where the reception unit has not received the three-dimensional structure information of the object, and set a second range as a second predetermined range in a case where the reception unit has received the three-dimensional structure information of the object:

a determination unit configured to determine whether the position detected by the second position and orientation detection unit exists within the first and the second predetermined ranges from a position of the object or not;

a correction unit configured to correct the captured image in a direction corresponding to the position and orientation detected by the second position and orientation detection unit based on the feature point information of the object and the information of the position and orientation of the imaging apparatus when the imaging apparatus has acquired the captured image in a case where the first range has been set by the setting unit and the determination unit has determined that the position detected by the second position and orientation detection unit exists within the first predetermined range from the position of the object, and correct the captured image based on the three-dimensional structure information of the object in a case where the second range has been set by the setting unit and the determination unit has determined that the position detected by the second position and orientation detection unit exists within the second predetermined range from the position of the object; and a display control unit configured to display the image corrected by the correction unit on a display unit, wherein the first range is smaller than the second range.

3. An image display method for an image display apparatus configured to display a captured image transmitted from an imaging apparatus on a display unit, the method comprising:
implementing at least one processor and at least one memory coupled to each other and cooperating to act:
detecting, by a position and orientation detection unit, a position and orientation of the image display apparatus;
receiving by a reception unit, from a server, the captured image, feature point information of an object included in the captured image, information of a position and orientation of the imaging apparatus when the imaging apparatus has acquired the captured image, and three-dimensional structure information of the object estimated from the feature point information of the object included in the captured image;
setting a first range as a first predetermined range in a case where the reception unit has not received the three-dimensional structure information of the object, and set a second range as a second predetermined range in a case where the reception unit has received the three-dimensional structure information of the object;
determining, by a determination unit, whether the position detected by the position and orientation detection unit exists within the first and the second predetermined ranges from a position of the object or not;
correcting the captured image in a direction corresponding to the detected position and orientation of the image display apparatus based on the feature point information of the object and the information of the position and orientation of the imaging apparatus when the imaging apparatus has acquired the captured image in a case where the first range has been set and it is determined that the position detected by the position and orientation detection unit exists within the first predetermined range from the position of the object, and correct the captured image based on the three-dimensional structure information of the object in a case where the second range has been set and it has determined that the position detected by the position and orientation detection unit exists within the second predetermined range from the position of the object; and displaying the corrected image on the display unit, wherein the first range is smaller than the second range.

4. A non-transitory computer-readable storage medium storing a program that causes a computer to execute the image display method according to claim 3.

* * * * *